(12) United States Patent
Gregg et al.

(10) Patent No.: US 6,779,129 B2
(45) Date of Patent: Aug. 17, 2004

(54) METHOD, ARTICLE OF MANUFACTURE AND APPARATUS FOR COPYING INFORMATION TO A STORAGE MEDIUM

(75) Inventors: Leon Edward Gregg, Rochester, MN (US); Thomas Alan Bjork, Rochester, MN (US); James Lawrence Tilbury, Rochester, MN (US); James Michael Van Oosbree, Rochester, MN (US); Armin Harold Christofferson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 09/728,277

(22) Filed: Dec. 1, 2000

(65) Prior Publication Data

US 2002/0069376 A1 Jun. 6, 2002

(51) Int. Cl.[7] .................................................. G06F 11/00
(52) U.S. Cl. ............................................... 714/6; 714/8
(58) Field of Search ............................... 714/5, 6, 7, 8

(56) References Cited

U.S. PATENT DOCUMENTS

| | | | | |
|---|---|---|---|---|
| 6,044,444 A | * | 3/2000 | Ofek | 711/162 |
| 6,049,874 A | * | 4/2000 | McClain et al. | 713/176 |
| 6,148,412 A | * | 11/2000 | Cannon et al. | 714/6 |
| 6,243,827 B1 | * | 6/2001 | Renner, Jr. | 714/6 |
| 6,260,069 B1 | * | 7/2001 | Anglin | 709/229 |
| 6,269,424 B1 | * | 7/2001 | Katsuragi et al. | 711/114 |
| 6,341,333 B1 | * | 1/2002 | Schreiber et al. | 711/114 |
| 6,581,167 B1 | * | 6/2003 | Gotoh et al. | 714/7 |

* cited by examiner

*Primary Examiner*—Nadeem Iqbal
*Assistant Examiner*—Timothy Bonura
(74) *Attorney, Agent, or Firm*—Moser, Patterson & Sheridan, LLP

(57) ABSTRACT

A method, apparatus and article of manufacture for copying information from a first storage medium to a second storage medium. A first storage medium of memory blocks is mapped into at least one data block and at least one directory block. Two passes of the first storage medium are then performed. In the first pass, each data block is copied from the first storage medium to the second storage medium. If a read error occurs while copying a data block, a location of the data block and a data file stored in the data block are identified to provide future error handling capability. In the second pass, each directory block is copied from the first storage medium to the second storage medium.

8 Claims, 5 Drawing Sheets

*Fig. 2A*

| VOLUME INFO (202) | DIRECTORY BLOCK (204) | DATA BLOCK (FILE A) (206) |
|---|---|---|

*Fig. 2B*

| DIRECTORY BLOCK (204) | DATA BLOCK (FILE A) (206) | DATA BLOCK (FILE B) (208) | DATA BLOCK (FILE C) (210) | DIRECTORY BLOCK (212) | DATA BLOCK (FILE D) (214) |
|---|---|---|---|---|---|

*Fig. 2C*

| DIRECTORY BLOCK (204) | DATA BLOCK (FILE A) (206) | USABLE BLOCK (216) | DATA BLOCK (FILE C) (210) | DIRECTORY BLOCK (212) | DATA BLOCK (FILE D) (214) |
|---|---|---|---|---|---|

*Fig. 2D*

| DIRECTORY BLOCK (218) | DATA BLOCK (FILE X) (220) | BAD SPOT (222) | DATA BLOCK (FILE X) (224) |
|---|---|---|---|

| VOLUME INFO (302) | DIRECTORY BLOCK (304) | DATA BLOCK (306) | BAD SPOT (308) | DATA BLOCK (310) | DIRECTORY BLOCK (312) | UNUSED BLOCK (314) | DATA BLOCK (316) |
|---|---|---|---|---|---|---|---|
| VVVV | DDD | FFFF | BBB | FFF* | DD | AAAA | FFF |

V = Volume Information
D = Directory Information
F = Data File Information
B = Bad Spot
A = Available (Unused) Space

METHOD, ARTICLE OF MANUFACTURE AND APPARATUS FOR COPYING INFORMATION TO A STORAGE MEDIUM

BACKGROUND OF THE DISCLOSURE

1. Field of the Invention

The invention relates to computers and computer memory. More particularly, the invention relates to a method, article of manufacture and apparatus for copying information from a source storage medium to a target storage medium.

2. Description of the Background Art

A computer system generally includes at least one memory unit or storage medium to store important data files. To prevent the loss of these data files, the computer system typically performs a periodic backup of the storage medium. The backup of the (source) storage medium copies the contents of the (source) storage medium to another (target) storage medium.

In one method to backup the source storage medium, each file in the source storage medium is individually copied to the target storage medium. This method of "file by file" copying utilizes a directory or list of all files in the source storage medium. Examples of the "file by file" copying include the DOS (disk operating system) "copy *.*" command or the copy of a folder in the Windows operating system. To copy a file, the "file by file" method traverses the list to locate the file, reads the file from the source storage medium and writes the file to the target storage medium.

Although the "file by file" method provides a quick identification of errors identified during copying of the source storage medium, the "file by file" method often requires a high overhead to copy files. First, the copying of each file requires seeking or traversing the directories in both the source and target storage media. Second, the copying of each file requires an update of the directory data in the target storage medium. With source media possibly containing up to hundreds of thousands of files, the cumulative time to traverse and update the directory introduces a considerable delay to copy files from the source storage medium.

In another method to backup the source storage medium, each memory block in the source storage medium is sequentially copied to the target storage medium without regard to what type of data is being copied. An example of this "block by block" method is the DOS diskcopy command. To copy a block, the "block by block" method simply reads the block from the source storage medium and writes this block to the target storage medium.

Although the "block by block" method provides a quick copy of the source storage medium to the target storage medium, the "block by block" method fails if any errors exist in the source or target storage media. For example, the copying fails if a block in the source storage medium cannot be read. Additionally, the copying fails if a bad block exists in the target storage medium and cannot be moved somewhere else.

Moreover, the "block by block " copying of unused blocks may cause problems in some types of media. For example, magneto optical (MO) disks require an explicit erase of an unused block before rewriting the block with different data. Writing to an unused block without first explicitly erasing the block causes an error during reading of the block. Moreover, if the "block by block" method attempts to read an explicitly erased block, an optical disk drive would halt the read and initiate an error recovery procedure. However, the error recovery procedure is slow and significantly delays the copying process.

To overcome the disadvantages associated with the conventional "block by block" copying method, a "map" of source storage medium may be created. The map identifies the used, and erased blocks in the source storage medium. However, if a read error occurs while copying the source storage medium, the location of the read error is unknown. This limits the ability of the computer system to perform error handling on the source storage medium.

Therefore, a need exists for a method and apparatus for copying information from the source storage medium to the target storage medium in an efficient manner, while improving error handling.

SUMMARY OF THE INVENTION

The invention provides a method, apparatus and article of manufacture for copying information from a first storage medium to a second storage medium. Specifically, the method initially maps at least one data block and at least one directory block from a plurality of memory blocks contained on the first storage medium. The method then copies each data block from the first storage medium to a second storage medium. If a read error occurs while copying a data block, the method identifies a location of the data block and a data file stored in the data block where the read error occurred. The method then copies each directory block from the first storage medium to the second storage medium.

In another embodiment of the invention, an apparatus comprising a main memory, a source storage medium, and a processor is provided. The main memory stores a disk copy program. The source storage medium contains information to be copied to a target storage medium. The processor performs a method upon executing the disk copy program retrieved from the memory. The method performed initially maps at least one data block and at least one directory block from a plurality of memory blocks contained on a first storage medium. The method then copies each data block from the first storage medium to a second storage medium. If a read error occurs while copying a data block, the method identifies a location of the data block and a data file stored in the data block where the read error occurred. The method then copies each directory block from the first storage medium to the second storage medium.

Additionally, a computer readable medium storing a software program is provided, where the software program, when executed by a processor of a computer, causes the computer to perform a method. In one embodiment of the computer readable medium, the method initially maps at least one data block and at least one directory block from a plurality of memory blocks contained on a first storage medium. The method then copies each data block from the first storage medium to a second storage medium. If a read error occurs while copying a data block, the method identifies a location of the data block and a data file stored in the data block where the read error occurred. The method then copies each directory block from the first storage medium to the second storage medium.

BRIEF DESCRIPTION OF THE DRAWINGS

The teachings of the present invention can be readily understood by considering the following detailed description in conjunction with the accompanying drawings, in which:

FIGS. 2A–2D illustrate the processing of different types of memory blocks;

FIG. 3 depicts a portion of a map in accordance with the present invention;

To facilitate understanding, identical reference numerals have been used, where possible, to designate identical elements that are common to the figures.

DETAILED DESCRIPTION OF THE PREFERRED EMBODIMENT

The invention provides a method, article of manufacture, and apparatus for copying information from a first storage medium to a second storage medium. A first storage medium of memory blocks is mapped into at least one data block and at least one directory. In one embodiment, two passes of the first storage medium are then performed. In the first pass, each data block is copied from the first storage medium to the second storage medium. If a read error occurs while copying a data block, a location of the data block and a data file stored in the data block where the read error occurred is identified. In the second pass, each directory block is copied from the first storage medium to the second medium. By identifying the data block and associated data file when a read error occurs, the present invention provides efficient copying of the source storage medium with improved error handling capability.

Figure 1:
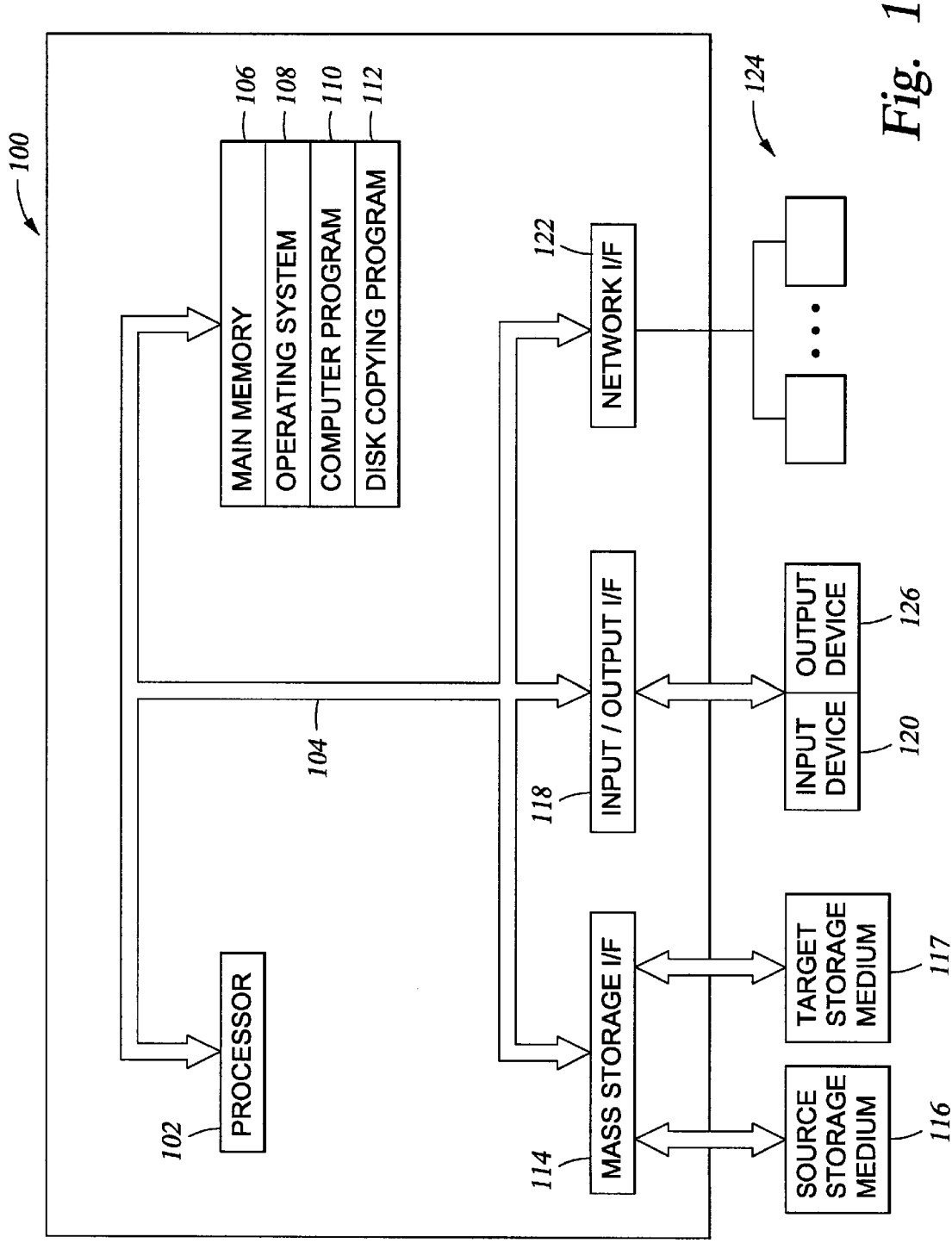
FIG. 1 depicts a high level block diagram of a computer system utilized in the present invention.

FIG. 1 depicts an illustrative computer system 100 utilized in accordance with the present invention. The computer system 100 may represent any type of computer, computer system or other programmable electronic device, including a client computer, a server computer, a portable computer, an embedded controller, and the like. The computer system 100 may be a standalone device or coupled to a computer network system. In one embodiment, the computer system 100 is an AS/400 available from International Business Machines of Armonk, N.Y.

The computer system 100 is shown in a multi-user programming environment having at least one processor 102, which obtains instructions and data from a main memory 106 via a bus 104. The main memory 106 includes an operating system 108, a computer program 110, a disk copying program 112. In addition, the main memory 106 may contain various data structures (not shown). The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. In one embodiment, the computer system 100 is illustratively coupled to a source storage medium 116, a target storage medium 117, input devices 120, output devices 126, and a plurality of networked devices 124. Each of these peripheral devices is operably coupled to the computer system 100 via respective interfaces. For example, the computer system 100 is coupled to the source storage medium 116 and the target storage medium 117 via a mass storage interface 114. Additionally, the computer system 100 is coupled to the input device 120 and the output device 126 via an input/output interface 118, and coupled to the plurality of networked devices 124 via a network interface 122.

The mass storage interface 114 comprises the physical components to implement the copying from the source storage medium 116 to the target storage medium. Specifically, the mass storage interface 114 may comprise a disk drive used for copying data blocks and directory blocks from the source storage medium 116 to the target storage medium 117, i.e., reading of the source storage medium 116, writing to the target storage medium 117. The disk drive is also used for traversing the source storage medium 116. Additionally, the mass storage interface 114 may implement conventional error correction methods.

The source storage medium 116 and the target storage medium 117 may comprise either permanent or removable direct access storage devices (DASD). The source storage medium 116 may comprise a read only medium or any other type of medium capable of providing information. Illustratively, the target storage medium 117 may comprise a direct overwrite medium such as a digital versatile disk (DVD), an erasable medium such as a magnetic optical (MO) medium, a write-once medium such as a recordable compact disk (CD), or any other type of medium capable of receiving information. The source storage medium 116 and the target storage medium 117 are each configured as a plurality of memory blocks. Each of these memory blocks may be utilized to store information such as data files, directory information, and volume or header information.

The input devices 120 may comprise any device utilized to provide input to the computer system 100. Examples of input devices 120 include a keyboard, a keypad, a light pen, a touch screen, a button, a mouse, a track ball, a speech recognition unit, and the like. The output devices 126 may comprise any conventional display screen. Although shown separately from the input devices 120, the output devices 126 and input devices 120 could be combined. For example, a display screen with an integrated touch screen, and a display with an integrated keyboard, or a speech recognition unit combined with a text speech converter could be used.

In general, the routines executed to implement the embodiments of the invention, whether implemented as part of an operating system or a specific application, component, program, object, module or sequence of instructions will be referred to herein as the disk copying program 112, or simply as the program 112. The program 112 typically comprises one or more instructions that are resident at various times in various memory and storage devices in the computer system 100. When read and executed by one or more processors 102 in the computer system 100, the program 112 causes that computer system 100 to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing or computer readable media used to actually carry out the distribution. Examples of signal bearing or computer readable media include, but are not limited to, recordable type media such as volatile and nonvolatile memory devices, floppy and other removable disks, hard disk drives, optical disks (e.g., CD-ROM, DVD, and the like), among others. Examples of transmission type media such as digital and analog communication links.

In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

The disk copying program 112, when executed by the processor 102, initially maps at least one data block and at least one directory block from a plurality of memory blocks contained on the first storage medium. The program 112 copies each data block from the first storage medium to a second storage medium. In the first pass, each data block is copied from the first storage medium to the second storage medium. If a read error occurs while copying a data block, a location of the data block and a data file stored in the data block where the read error occurred is identified. In the second pass, each directory block is copied from the first storage medium to the second storage medium. Illustratively, the first storage medium is the source storage medium 116 and the second storage medium is the target storage medium 117. By identifying the data block and associated data file when a read error occurs, efficient copying of the source storage medium with improved error handling capability is provided.

Although the source storage medium 116 and the target storage medium 117 are depicted in FIG. 1 as being coupled to the same computer system 100, the source storage medium 116 and the target storage medium 117 may also be coupled to separate devices. For example, the source storage medium 116 may be coupled to the computer system 100, while the target storage medium 117 may be coupled to a networked device 124.

FIGS. 2A–2D illustrate the processing of different types of memory blocks in the source storage medium 116 and the target storage medium 117. The source storage medium 116 and the target storage medium 117 each comprises a plurality of memory blocks. Each memory block may contain different types of information. For example, a memory block containing file data information is considered as a "data block," a memory block containing directory information is considered as a "directory block," and a memory block containing header information, e.g., volume information is considered as a "header block." If the memory block contains no information, the memory block is considered as a "usable block" or "available block." If the memory block is incapable of being identified, the memory block is considered as a "bad block."

FIG. 2A depicts a source storage medium 116 initially containing header information, directory information and at least a portion of a data file. Illustratively, the source storage medium 116 comprises a header block 202, a directory block 204, and a data block 206. The header block 202 represents a memory block containing standardized volume information. The directory block 204 represents a memory block containing directory information, which may be located from the volume information contained in the header block 202. Directory information may contain information directed to a data file, e.g., name of the data file, the date the data file was written, and the physical location of the data file on the source storage medium 116. The data block 206 contains at least a portion of a data file. In the example shown in FIG. 2A, the data block 206 contains information on data file A.

FIG. 2B illustrates the addition of data files and directory information to the source storage medium 116 of FIG. 2A. Illustratively, data block 208, data block 210, directory block 212 and data block 214 contain the additional directory and data file information. The data blocks 208 and 210 contain at least a portion of respective data files B and C. If the directory block 204 may only direct information contained in data blocks 206, 208 and 210, then additional directory information is required to direct other data blocks. Directory block 212 contains directory information related to additional data blocks. Once additional directory information is added to directory block 212, directory block 204 is updated to reference the new directory block 212, such that the continuation of the directory in directory block 204 can be located in directory block 212. After directory information is added to directory block 212, additional data file information is added to data block 214. The data block 214 illustratively contains at least a portion of data file D. The creation of additional directory blocks and data blocks may be repeated as many times as required.

FIG. 2C illustrates the deletion of data file B from the source storage medium 116. As the data file B is deleted, the data block 208 is transformed into a memory block capable of storing additional information, e.g., at least a portion of a data file or directory information. Such a memory block 216 is considered a usable block or an available block.

FIG. 2D illustrates a potential problem when writing information onto the target storage medium 117. Initially, the directory information and a portion of data file X are written into memory blocks identified as directory block 218 and data block 220. However, data block 222 contains a bad spot, so any attempt to write another portion of data file X or any other information into that block 222 fails. Accordingly, the next portion of data file X is written instead into the next memory block or data block 224.

FIG. 3 depicts a portion of a map 300 of the source storage medium 116 in accordance with the present invention. Once information is stored in the source storage medium 116, the memory blocks illustratively comprise a header (volume) block 302, a directory block 304, a data block 306, a bad spot block 308, a data block 310, a directory block 312, a unused block 314 and a data block 316. The map 300 identifies the type of each of the memory blocks. For example, if each block comprises four sectors, the map 300 may represent information in each sector with a letter. Illustratively, V represent volume or header information, D represents directory information, F represents information pertaining a data file, B represents a bad sped spot in the source storage medium 116, A represents an available or unused sector, and * represents a unreadable sector. Once the map 300 is created, data files and directory information may be copied from the source storage medium 116 to a target storage medium 117.

The examples depicted in FIGS. 2A–2D and FIG. 3 are only illustrative and are not considered as limiting the scope of the present invention. For example, FIGS. 2A–2C and FIG. 3 may also apply to a target storage medium 117. Additionally, other configurations of data file information and directory information are possible and contemplated within the scope of the invention. Moreover, the map 300 may also apply to blocks having a variable number of sectors and blocks having more or less than four sectors.

Figure 4:
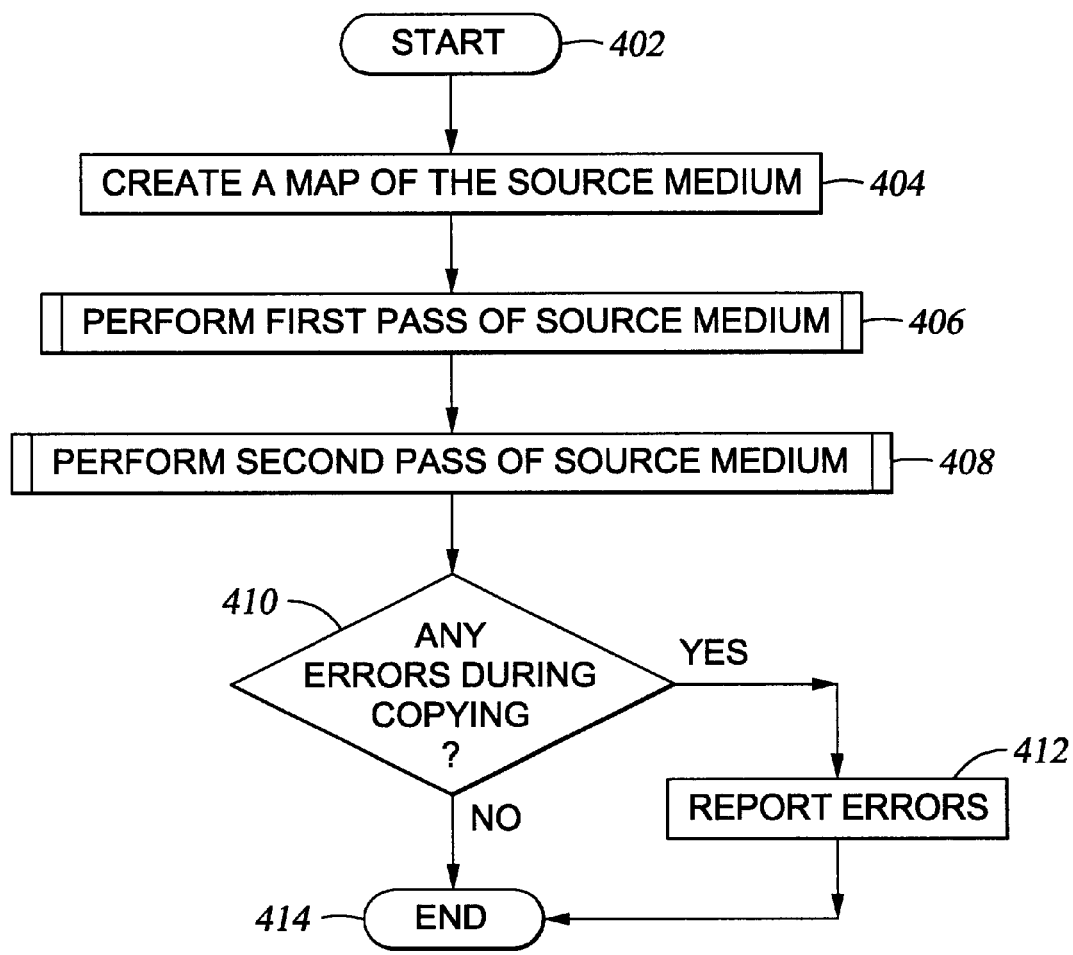
FIG. 4 depicts a flow diagram of a method for copying information from a source storage medium to a target storage medium in accordance with the present invention.
Figure 5:
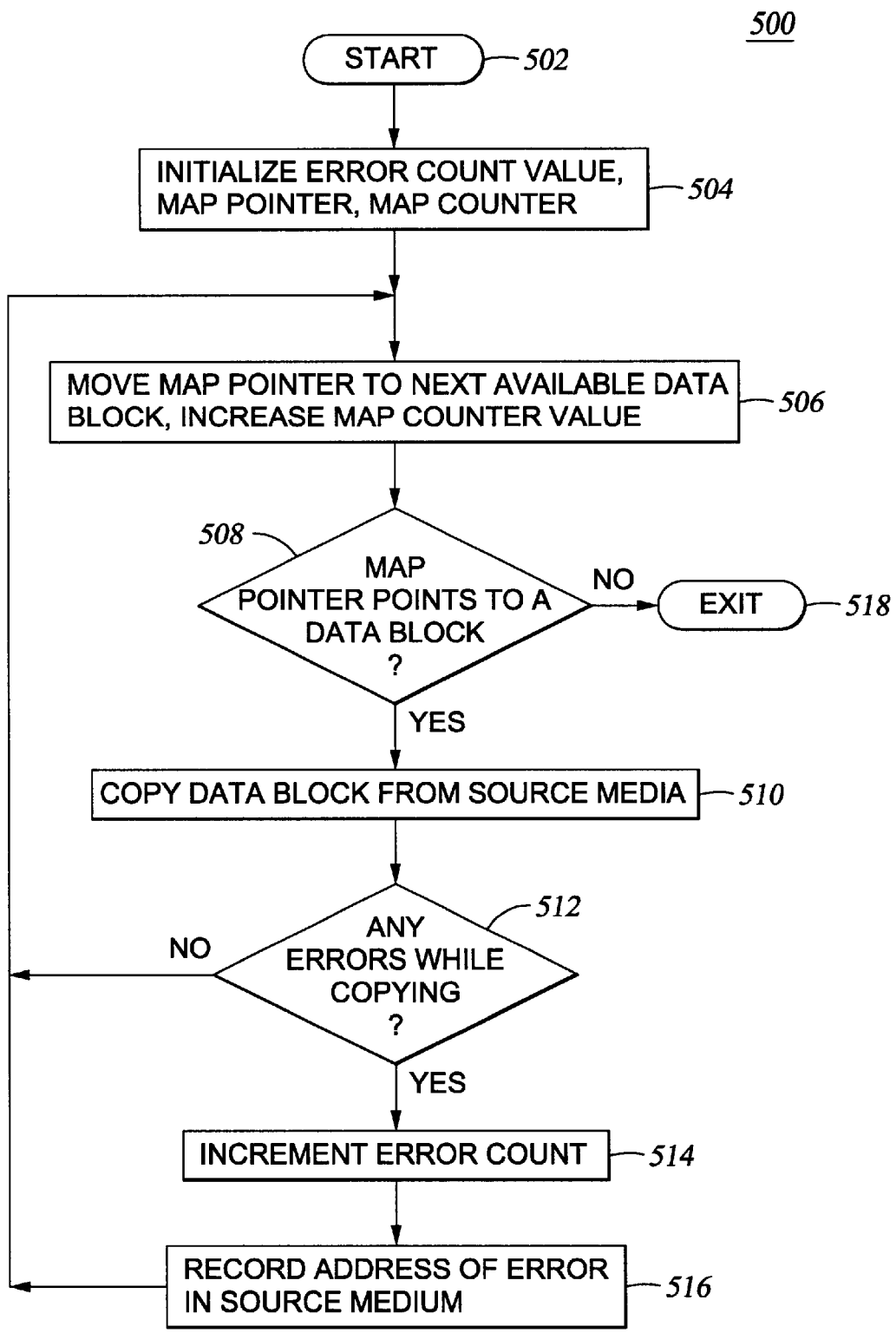
FIG. 5 depicts a flow diagram of a method utilized during a first pass of the source storage medium.
Figure 6:
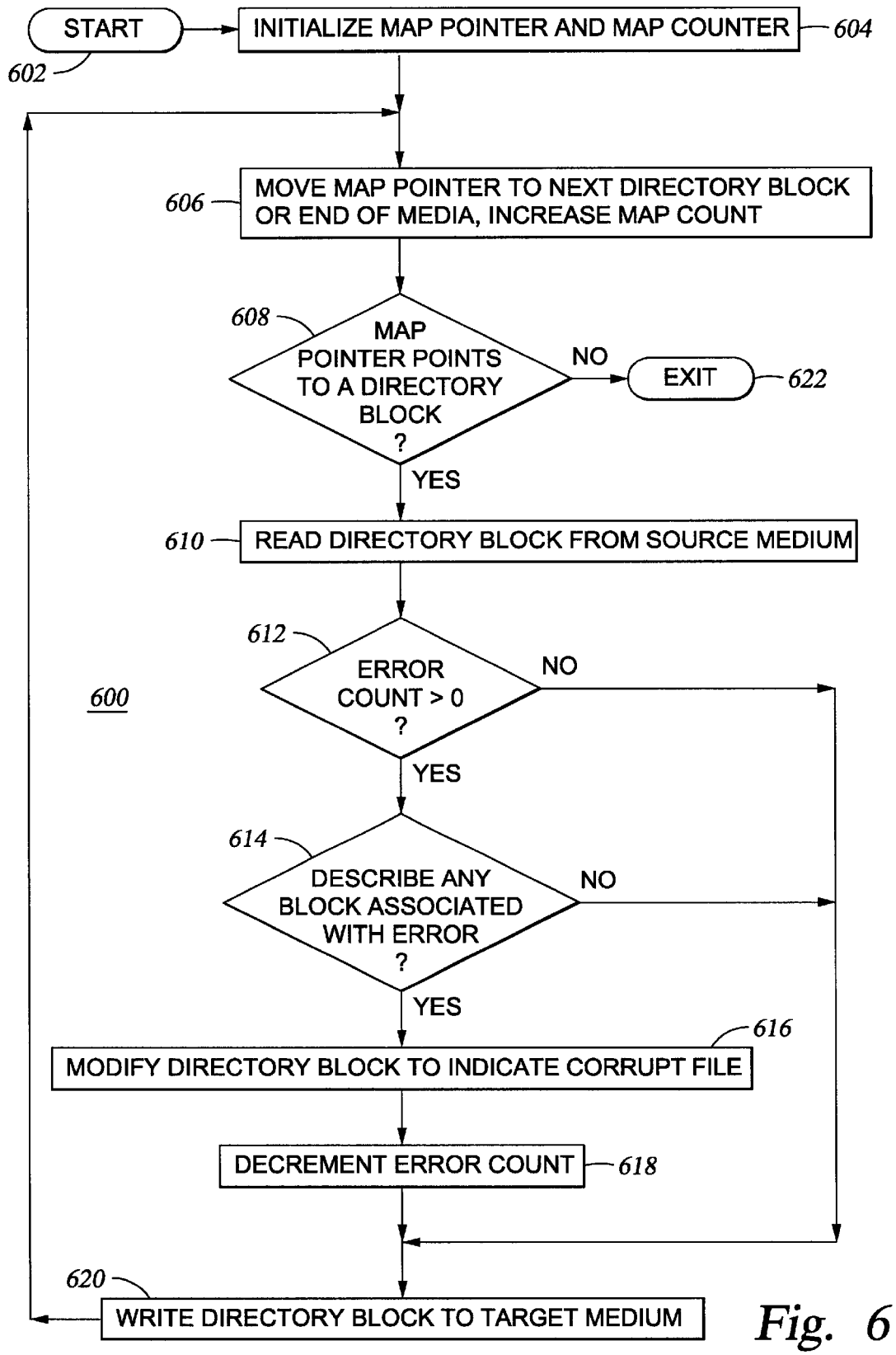
FIG. 6 depicts a flow diagram of a method utilized during a second pass of the source storage medium.

In accordance with the present invention, FIG. 4 depicts a flow diagram of a method 400 for copying information from a first (source) storage medium to a second (target) storage medium. FIG. 5 depicts a flow diagram of a method utilized during a first pass of the source storage medium in FIG. 4. FIG. 6 depicts a flow diagram of a method utilized during a second pass of the source storage medium in FIG. 4. The steps of these methods, as embodied in the disk copying program 112, are executed by the processor 102 and implemented by the mass storage interface 114, e.g., a disk drive. To best understand the invention, the reader should simultaneously refer to FIGS. 4–6.

Referring to FIG. 4, the method 400 starts at step 402 and proceeds to step 404, where a map of the source storage medium 16 is created. Step 404 traverses each directory block to create a map of the memory blocks of the source storage medium 116. The map identifies memory blocks as directory blocks containing directory information, data blocks containing file data, unused or unavailable blocks, or bad areas.

The method 400 proceeds to step 406, where a first pass of the source storage medium 116 is performed. Step 406 generally copies each data block from the source storage medium 116 to the target storage medium 117. One embodiment of step 406 is a method 500 described below with respect to FIG. 5. Once the first pass is performed, the method 400 proceeds to step 408, where a second pass of the source storage medium 116 is performed. Step 408 generally copies each directory block from the source storage medium 116 to the target storage medium 117. One embodiment of step 408 is a method 600 described below with respect to FIG. 6.

Once the second pass is performed, the method 400 proceeds to step 410, where a query determines whether any errors were identified during the first and second passes of the source storage medium 116. If any errors were identified, the method 400 proceeds to step 412, where the errors are reported or displayed on the output device 126. In one embodiment, step 412 reports or displays a location of a read error and an identifier, e.g., a file name, of a data file at the location where the read error occurred. After step 412, the method 400 ends at step 414. If no errors were identified, the method 400 simply ends at step 414.

Referring to FIG. 5, a method 500 utilized during a first pass of the source storage medium 116 is disclosed. The method 500 starts at step 502 and proceeds to step 504, where an error count value, a map pointer and a map counter are initialized. The error count value represents the number of errors during the first scan of the source storage medium 300. The map pointer and the map counter indicate the respective position and address of a memory block in the source storage medium 116. The error count value is initialized to zero, while the map pointer and map counter are respectively initialized to the position and address at the start of the map 300 for the source storage medium 116. Once these variables are initialized, the method 500 proceeds to step 506, where the map pointer is moved to the next data block or to a position at end of the map 300 for the source storage medium 116. Step 506 also increases the map counter value to the address of the memory block pointed to by the map pointer.

At step 508, a query determines whether the map pointer is pointing to a data block. In other words, step 508 determines whether the value of the map counter is the address of the data block. If the map pointer is pointing to a data block, the method 500 proceeds to step 510, where the data block is copied from the source storage medium 116 to the target storage medium 117. Namely, the data block is read from the source storage medium 116 and written to the target storage medium 117.

The method 500 proceeds to step 512, where a query determines whether any errors, e.g., read errors, were found while copying the data block at step 510. Step 512 determines whether a read error occurs while reading the source storage medium 116 or whether a write error occurs while writing to the target source medium 117. Step 512 is performed using conventional error detection methods known in the art. If no errors were found, the method 500 returns to move the map pointer and increase the map counter value at step 506.

If any errors were found, the method 500 increments the error count value at step 514, and proceeds to step 516, where location or address of the source storage medium 116 where a read error occurred or target storage medium 117 where a write error occurred is identified and recorded. In one embodiment, step 516 identifies and records the memory block and associated file at the memory block where the error occurred. Identification of the location of the error, e.g., read error, and the associated file improves the error handling capability of the computer system 100. After recording the location of the error, the method 500 returns to step 506, where the map pointer moved and the map counter value is increased.

Returning to step 508, if the map pointer is not pointing to a data block, the method 500 proceeds to exit at step 518. In this case, the map pointer is pointing at the end of the source storage medium 116, as all data blocks have already been copied.

Referring to FIG. 6, a method 600 utilized during a second pass of the source storage medium 116 is disclosed. The method 600 starts at step 602 and proceeds to step 604, where the map pointer and map counter are respectively initialized to the position and address at the start of the map. At step 606, the method 600 moves the map pointer to the next directory block or to a position at end of the source storage medium 116. Step 606 also increases the map counter value to the address of the memory block pointed to by the map pointer.

The method 600 proceeds to step 608, where a query determines whether the map pointer is pointing to a directory block. In other words, step 608 determines whether the value of the map counter is the address of the directory block. If the map pointer is pointing to a directory block, the method 600 proceeds to step 610, where the directory block is read from the source storage medium 116.

The method 600 proceeds to step 612, where a query determines whether the value of the error count is greater than zero. As described above, the error count was incremented each time an error occurred while copying a data block in FIG. 5. If the error count is zero, the method 600 proceeds to write the directory block to the target storage medium 117 at step 620 and returns to move the map pointer and increase the map counter value at step 606. If the error count is greater than zero, the method 600 proceeds to step 614, where a query determines whether the directory block describes or references any data block associated with an error.

If the directory block does not describe any data block associated with an error, the method proceeds to write the directory block to the target storage medium at step 620, and returns to move the map pointer and increase the map counter value at step 606. If the directory block describes any data block associated with an error, the method 600 proceeds to step 616, where the directory block is modified to indicate that the data file is corrupted. At step 618, the error count is decremented or decreased accordingly in the unlikely event where a directory block describes two or more data blocks associated with an error. The method 600 proceeds to write the directory block to the target storage medium at step 620, and returns to move the map pointer and increase the map counter value at step 606.

Returning to step 608, if the map pointer is not pointing to a directory block, the method 600 proceeds to exit at step 618. In this case, the map pointer is pointing at the end of the source storage medium 116, as all directory blocks have already been copied.

Although various embodiments which incorporate the teachings of the present invention have been shown and described in detail herein, those skilled in the art can readily devise many other varied embodiments that still incorporate these teachings.

What is claimed is:

1. A method for copying information, the method comprising:
    mapping at least one data block and at least one directory block from a plurality of memory blocks contained on a first storage medium;
    copying each data block from the first storage medium to a second storage medium by reading the data block from the first storage medium writing the data block to the second storage medium;
    determining whether an error occurs while copying each data block, where the error occurs in at least one of the first storage medium and the second storage medium;
    identifying, if the error is determined to occur, a data file at the data block of the first storage medium when the error occurred, and at least one of a location of a read error in the first storage medium and the location of a write error in the second storage medium;
    copying each directory block from the first storage medium to the second storage medium after copying each data block from the first storage medium to the second storage medium; and
    reporting, for each data block where the read error occurs, the location of that data block in the first storage medium.

2. A method for copying information, the method comprising:
    mapping at least one data block and at least one directory block from a plurality of memory blocks contained on a first storage medium;
    copying each data block from the first storage medium to a second storage medium;
    determining whether an error occurs while copying each data block, where the error occurs in at least one of the first storage medium and the second storage medium;
    identifying, if the error is determined to occur, a data file at the data block of the first storage medium when the error occurred, and at least one of a location of a read error in the first storage medium and the location of a write error in the second storage medium;
    copying each directory block from the first storage medium to the second storage medium by reading the directory block from the first storage medium and writing the directory block to the second storage medium after copying each data block from the first storage medium to the second storage medium; and
    reporting, for each directory block describing the data block where the read error occurred, the directory block as a bad block.

3. A method for copying information, the method comprising:
    mapping at least one data block and at least one directory block from a plurality of memory blocks contained on a first storage medium, wherein at least one directory block comprises a header block containing a logical address of another directory block;
    copying each data block from the first storage medium to a second storage medium;
    determining whether an error occurs while copying each data block, where the error occurs in at least one of the first storage medium and the second storage medium;
    identifying, if the error is determined to occur, a data file at the data block of the first storage medium when the error occurred, and at least one of a location of a read error in the first storage medium and the location of a write error in the second storage medium; and
    copying each directory block from the first storage medium to the second storage medium after copying each data block from the first storage medium to the second storage medium.

4. A method for copying information, the method comprising:
    mapping at least one data block and at feast one directory block from a plurality of memory blocks contained on a first storage medium, wherein each of the plurality of memory blocks are partitioned into at least one sector;
    copying each data block from the first storage medium to a second storage medium;
    determining whether an error occurs while copying each data block, where the error occurs in at least one of the first storage medium and the second storage medium;
    identifying, if the error is determined to occur, a data file at the data block of the first storage medium when the error occurred, and at least one of a location of a read error in the first storage medium and the location of a write error in the second storage medium; and
    copying each directory block from the first storage medium to the second storage medium after copying each data block from the first storage medium to the second storage medium.

5. A computer readable medium storing a software program that, when executed by a computer, causes a processor to perform a method comprising:
    mapping at least one data block end at least one directory block from a plurality of memory blocks contained on a first storage medium;
    copying each data block from the first storage medium to a second storage medium by reading the data block from the first storage medium, writing the data block to the second storage medium and determining whether a read error occurs while reading the data block in the first storage medium;
    identifying, if a read error occurs while copying each data block, a location of the read error in the first storage medium;
    identifying a data file stored in the data block where the read error occurred;
    copying each directory block from the first storage medium to the second storage medium after copying each data block from the first storage medium to the second storage medium; and
    reporting, for each data block where the read error occurs, the location of that data block in the first storage medium.

6. A computer readable medium storing a software program that, when executed by a computer, causes a processor to perform a method comprising:
    mapping at least one data block and at least one directory block from a plurality of memory blocks contained on a first storage medium;

copying each data block from the first storage medium to a second storage medium by reading the data block from the first storage medium, writing the data block to the second storage medium and determining whether a read error occurs while reading the data block in the first storage medium;

identifying, if a read error occurs while copying each data block, a location of the read error in the first storage medium;

identifying a data file stored in the data block where the read error occurred;

copying each directory block from the first storage medium to the second storage medium after copying each data block from the first storage medium to the second storage medium;

determining whether the directory block describes a data block where an read error occurred upon copying the data block from the first storage medium to the second storage medium; and reporting, for each directory block describing the data block where the read error occurred, the directory block as a bad block.

7. A computer readable medium storing a software program that, when executed by a computer, causes a processor to perform a method comprising:

mapping at least one data block and at least one directory block from a plurality of memory blocks contained on a first storage medium, wherein at least one directory block comprises a header block containing a logical address of another directory block;

copying each data block from the first storage medium to a second storage medium;

identifying, if a read error occurs while copying each data block, a location of the read error in the first storage medium;

identifying a data file stored in the data block where the read error occurred; and copying each directory block from the first storage medium to the second storage medium after copying each data block from the first storage medium to the second storage medium.

8. A computer readable medium storing a software program that, when executed by a computer, causes a processor to perform a method comprising:

mapping at least one data block and at least one directory block from a plurality of memory blocks contained on a first storage medium, wherein each of the plurality of memory blocks are partitioned into at least one sector;

copying each data block from the first storage medium to a second storage medium;

identifying, if a read error occurs while copying each data block, a location of the read error in the first storage medium;

identifying a data file stored in the data block where the read error occurred; and copying each directory block from the first storage medium to the second storage medium after copying each data block from the first storage medium to the second storage medium.

* * * * *